Figure 1:
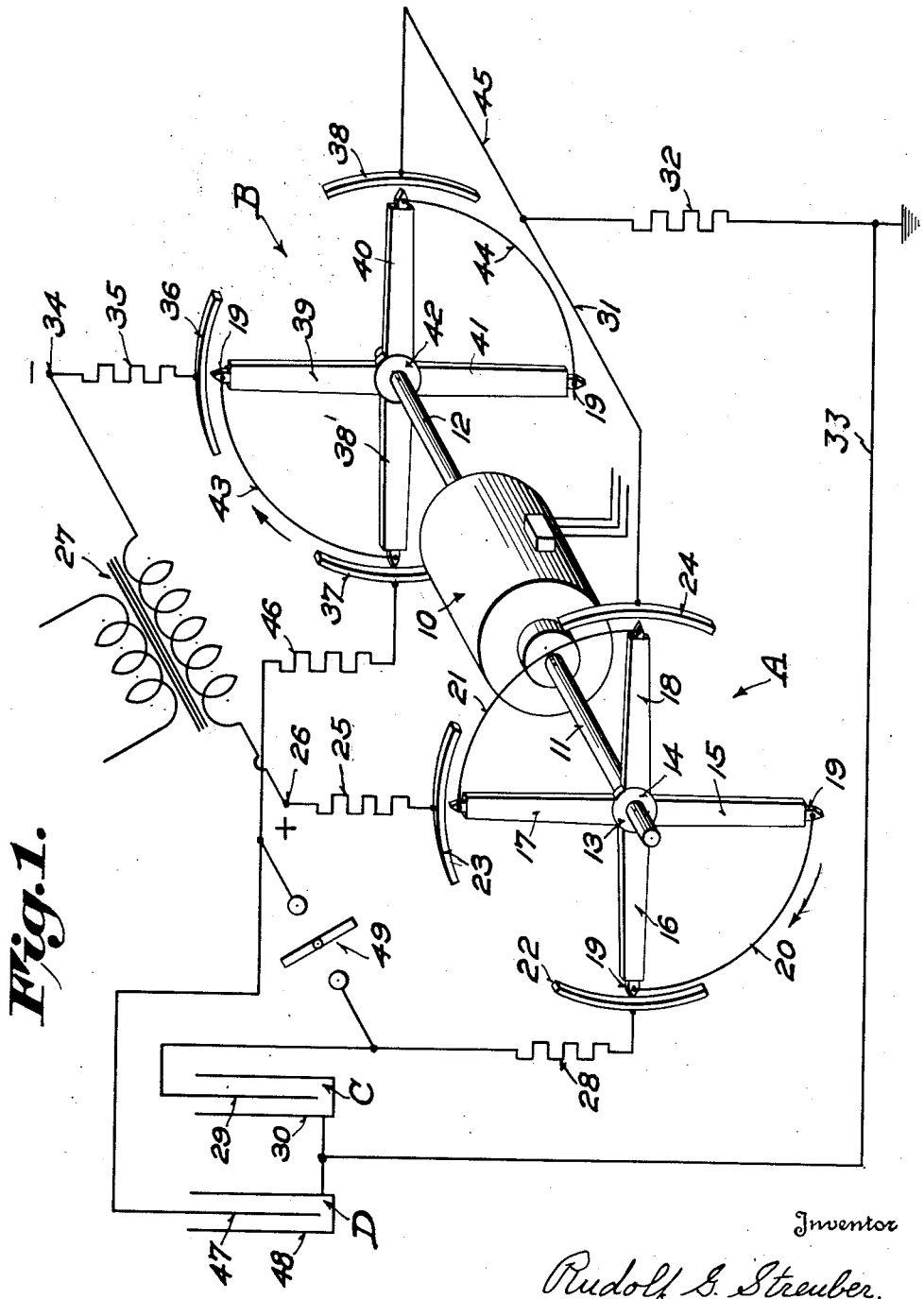

Aug. 21, 1951  R. G. STREUBER  2,565,005
DEVICE FOR RECTIFYING ALTERNATING CURRENTS
Filed Nov. 30, 1948  2 Sheets-Sheet 1

Inventor
Rudolf G. Streuber,
By
Stowell + Evans,
ATTORNEYS

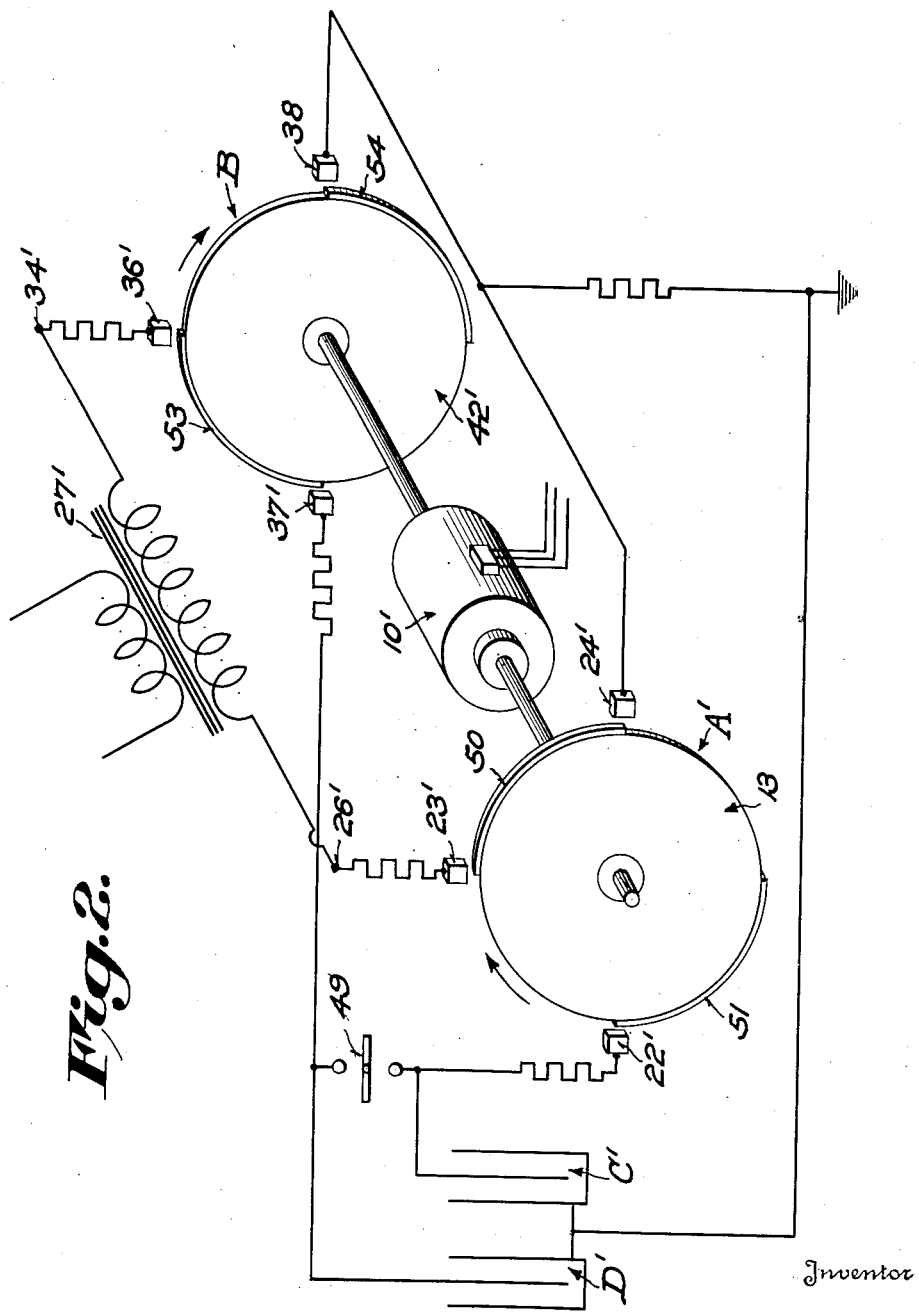

Patented Aug. 21, 1951

2,565,005

UNITED STATES PATENT OFFICE 2,565,005

DEVICE FOR RECTIFYING ALTERNATING CURRENT

Rudolf G. Streuber, West Rockport, Maine, assignor to Research Corporation, New York, N. Y., a corporation of New York Application November 30, 1948, Serial No. 62,607

2 Claims. (Cl. 171—97)

This invention relates to a device for rectifying alternating current and more particularly to such a device adapted to the rectification of high voltage alternating current.

The rectified current produced by the device of the invention may be used to advantage for energizing the complementary electrodes of electrical precipitators of the Cottrell type, which characteristically employ high voltage unidirectional current. For such purpose high voltage alternating current is typically supplied by the secondary of a transformer the primary of which is supplied with low frequency, low voltage alternating current from a power line. Such power line current typically may be 60 cycle, 220–440 volt alternating current and the transformer may step the line voltage up to 60,000 volts, for example.

An object of the invention is to provide a mechanical rectifier of simplified design having a minimum number of contact terminals and other parts so arranged and coordinated that high tension wiring to and from the rectifier is direct and well ordered. The construction of the rectifier permits the employment thereof in a relatively small and compact energizing unit including a transformer, resistors, wiring, switches and other components commonly employed in power supplies for electrical precipitators and other high tension apparatus.

Another object is to provide a mechanical rectifier wherein the voltage loss across the rectifier is low.

Another object is to provide a mechanical rectifier that is selectively convertible from alternate half-wave output to full wave output by simple switch means.

Still another object is to provide a high voltage rectifier wherein the number of potential leakage paths is reduced to a minimum with concomitant reduction in the number of failures occurring at these vulnerable points.

The foregoing and other objects and advantages of the invention are achieved in a device for rectifying alternating current including a pair of rotary switches; means for rotating the rotors of the switches at one-half the cyclic rate of the alternating current to be rectified; each of the stator elements of the switches having an input conductor terminal and output conductor terminals spaced 90° ahead of and behind the input conductor terminal, the input conductor terminals of the stator elements providing connections to complementary terminals of the alternating current supply; the rotor elements of said switches having conductors connecting alternate quadrants of each rotor element, the rotor elements of the switches being positioned with respect to the stator elements thereof to connect the input terminal of one stator element successively to the leading and trailing output terminals thereof as the input terminal of the other stator element is connected successively to the trailing and leading output terminals thereof upon synchronous rotation of the rotor elements.

The invention is set forth in greater detail and other aims accomplished thereby are expressed in or are apparent from the following description of two exemplary embodiments thereof as shown in the accompanying drawings, in which:

Fig. 1 is a schematic perspective view of one form of rectifying device in accordance with the invention as employed in the energization of an electrical precipitation system; and Fig. 2 is a similar view of another form of the device.

Referring to the drawings, particularly to Fig. 1 thereof, the rectifying device shown includes a synchronous electric motor 10 the armature of which turns aligned shafts 11 and 12 at synchronous speed. A rotor 13 of rotary switch A is mounted on shaft 11 for rotation therewith, the rotor having a hub 14 and four quadrentally disposed radially extending arms 15, 16, 17 and 18, preferably formed of insulating material such as phenolic-fiber composition. The outer ends of the arms are provided with pointed conductive tips 19 and the tips of arms 15 and 16 are connected together by an arcuate jumper wire 20. The tips of arms 17 and 18 are similarly interconnected by a jumper wire 21.

Arranged slightly outside the circle of travel of the tips of rotor 13 are three contact terminals or arc shoes 22, 23 and 24. These terminals are conductive arcuate segments, preferably of metal, each extending over an arc of about 50° in the plane of rotation of the rotor 13 and being supported on centers spaced 90° apart. Contact terminal 23 is an input terminal or power input terminal of the rectifier, and is connected through a surge-damping resistor 25 to one terminal 26 of the secondary winding of a step-up transformer 27. Contact terminal 22 is an output terminal or load terminal and is connected through resistor 28 to the high tension electrode 29 of an electrical precipitator C having a tubular extended surface electrode 30. Contact terminal 24 is another output terminal or return terminal; it is connected through conductor 31 and resistor 32 to ground and through cable 33 to the extended surface electrode 30 of the precipitator C.

The complementary output terminal 34 of the transformer 27 is connected through a resistor 35 to the input contact terminal 36 of rotary switch B which is similar to the rotary switch A described hereinbefore. It will be noted, as regards switch B, that the contact terminals 36, 37 and 38 thereof are parallel to and aligned with the corresponding contact terminals of switch A and that the arms 38', 39, 40 and 41 of the rotor 42 of switch B are parallel to and aligned with the arms 15, 16, 17 and 18 of rotor 13 of switch A. It will be seen, however, that the jumper wires 43 and 44 of switch B, connecting the tips of arms 38 and 39 and the tips of arms 40 and 41 respectively, are displaced 90° with respect to the jumper wires 20 and 21 of switch A.

Output terminal 38 of switch B is connected through cable 45 to the corresponding output terminal 24 of switch A and output terminal 37 of switch B is connected through resistor 46 to the high tension electrode 47 of a second precipitator D, the extended surface electrode 48 of which is grounded.

A single-pole-single-throw switch 49 is provided for connecting the precipitator high tension electrodes together to form a common load for the rectifier. It will also be noted that when the switch 49 is closed, the output leads from contact terminals 22 and 37 are connected in parallel.

The rectifier motor 10 is preferably a four pole synchronous motor of any of a variety of types commonly employed in the art of mechanical rectification. The motor shown is a three-phase motor that is supplied with three-phase current from a conventional power line. The primary winding of the transformer 27 is supplied with single phase current from the same source as the motor; thus, as is conventional, the motor runs in synchronism with the alternations of the current flowing to the transformer primary and at one-half the cyclic rate thereof. If the current supplied to the transformer alternates at 60 cycles per second, the speed of the motor is 30 revolutions per second or 1,800 R. P. M. For proper phasing, the switch rotors 13 and 42 are positioned on the motor shafts 11 and 12 in such relation that when current flow in the secondary winding of the transformer is at a maximum value, one of the arms of each rotor is in alignment with the input terminal of each rotary switch.

In operation, assuming the transformer and rectifier motor to be energized, and visualizing a stage of operation in which the parts are in the positions shown in Fig. 1, and further assuming that transformer terminal 34 is negative and transformer terminal 26 is positive, a closed circuit is provided from terminal 26 through input terminal 23 of switch A, the tip of rotor arm 17, the jumper wire 21, the tip of rotor arm 18, output terminal 24 and conductor 31 to the load. The circuit to output terminal 38 of switch B is open, the jumper wire 44 leading, in the position illustrated, to the isolated tip of rotor arm 41.

The return circuit from the load is completed through contact terminal 37 of switch B, the jumper wire 43, contact terminal 36, and resistor 35 to terminal 34 of the transformer.

As the transformer reverses polarity and terminal 34 becomes positive and terminal 26 negative, the switch rotors advance 90° in the direction of the arrows of Fig. 1. The circuit then is closed from transformer terminal 34 through contact terminal 36 of switch B and contact terminal 38 to the load, the circuit being open at contact terminal 24 of switch A, owing to the position of the rotor of that switch. The return circuit from the load passes through switch A to terminal 26 of the transformer, through contact terminal 22 and contact terminal 23.

It will be observed that switch 49 is open and it will be understood that, under such condition, the rectified current flows alternately through precipitators C and D in half wave pulses. Such periodic or pulsating energization of precipitators is sometimes desired for most efficient operation.

On the other hand, if it is desired to apply full wave rectified current to both precipitators C and D, it is only necessary to close switch 49, whereupon, return current from both precipitators flows alternately through switches A and B.

From the foregoing description, it will be seen that the output terminals of switches A and B having the same polarity, namely terminals 22 and 37 and terminals 24 and 38, may be coupled in parallel to apply full wave rectified current to a single load or may be separately connected to two loads to supply half wave rectified current alternately to each of the latter.

The device of Fig. 2 is essentially the same as the device of Fig. 1 described hereinbefore but employs switches of somewhat different construction.

Referring to Fig. 2, in which parts similar to those shown in Fig. 1 are identified by identical but primed reference numerals, and particularly to switch A' thereof, the contact terminals 22', 23' and 24' take the form of conductive blocks of shorter extent in the direction of rotation of the rotor 13' than the similar arcuate shoes 22, 23 and 24 of the device of Fig. 1. Rotor 13' has a solid disc of insulating material as distinguished from the rotor 13 which has four equally spaced radial arms. Arcuate, conductive jumper members 50 and 51 extend for approximately 90° along the periphery of the rotor disc and are spaced on centers 180° apart; they perform functions in the device of Fig. 2 corresponding to the functions performed by the arm tips 19 and jumper wires 21 and 20 of the rectifier of Fig. 1. The arc of conductive overlap of a jumper member between adjacent contact terminals may be increased, if desired, by extending the jumpers beyond the approximately 90° of arc that they are shown to occupy in Fig. 2; for example, the jumper members may extend over an arc of 100° to 140°.

Rotary switch B' is similar to rotary switch A', except that the jumper members 53 and 54 are displaced 90° from jumper members 50 and 51.

The rectifying device of Fig. 2 operates in much the same manner as that of Fig. 1, and, in view of the explanation of operation given hereinbefore, a detailed statement of operation of the rectifier of Fig. 2 is not necessary. Suffice it to say that current flow from the transformer through the rectifying device to the load follows the same course through the rectifying switches A' and B' in the device of Fig. 2 as it does through the switches A and B of the device of Fig. 1.

From the foregoing description it will be seen that the present invention provides an improved mechanical rectifying device wherein the number of parts required in a device for full and half wave rectification is minimized and the organization and arrangement of parts permits direct and convenient wiring of the device in a relatively small space. These and other aims of the invention are realized in full measure in the rectifier herein shown and described, and defined in the following claims.

I claim:

1. A device for rectifying alternating current comprising a pair of rotary switches, each switch having a stator element and a complementary rotor element, each of said stator elements comprising an input conductor terminal and output conductor terminals spaced 90° ahead of and behind said input conductor terminal, the corresponding conductor terminals of said stator elements being positioned in rectilinear arrangement and the input terminals thereof providing connections to complementary terminals of an alternating current power supply; a synchronous electric motor; a shaft driven by said motor; the rotor elements of said switches being mounted in common on said shaft for rotation therewith, said rotor elements comprising conductors connecting alternate quadrants of each rotor element, the connected quadrants of one rotor being displaced 90° with respect to the connected quadrants of the other rotor, whereby upon synchronous rotation of the rotor elements the input terminal of one stator element is connected successively to the leading and trailing output terminals thereof as the input terminal of the other stator element is being connected successively to the trailing and leading output terminals thereof; and switch means for selectively connecting said output terminals to common or separate loads.

2. A device for rectifying alternating current comprising a pair of cooperating rotary switches each including a rotor and a stator, the stator of each switch having terminals consisting of a load terminal, a return terminal positioned 180° from said load terminal, and a power input terminal positioned 90° from said load terminal, a rotatable shaft, said rotors being mounted in common on said shaft for rotation therewith and so positioned on said shaft as to cooperate with their corresponding stator terminals to connect in each switch the power input terminal alternately to the load terminal and to the return terminal upon each successive quarter revolution of the rotor, a synchronous electric motor rotating said shaft and said rotors at one-half the cyclic rate of the alternating current to be rectified and in such phase relation that when the power terminal of one switch is connected to the load terminal of said one switch the power terminal of the other switch is connected to the return terminal of said other switch, and switch means for selectively connecting said load terminals to common or separate loads.

RUDOLF G. STREUBER.

REFERENCES CITED

The following references are of record in the file of this patent:

UNITED STATES PATENTS

| Number | Name | Date |
| --- | --- | --- |
| 1,208,056 | Waite | Dec. 12, 1916 |
| 1,259,160 | Strong et al. | Mar. 12, 1918 |
| 1,655,635 | Smith | Jan. 10, 1928 |
| 1,784,122 | Wantz | Dec. 9, 1930 |